(12) United States Patent
Singh et al.

(10) Patent No.: US 12,033,361 B2
(45) Date of Patent: Jul. 9, 2024

(54) METHODS AND APPARATUS FOR LOSSLESS COMPRESSION OF GPU DATA

(71) Applicant: QUALCOMM Incorporated, San Diego, CA (US)

(72) Inventors: Ankitesh Kumar Singh, San Diego, CA (US); Cheng-Teh Hsieh, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 17/169,342

(22) Filed: Feb. 5, 2021

(65) Prior Publication Data

US 2022/0254070 A1    Aug. 11, 2022

(51) Int. Cl.
  *G06T 9/00*     (2006.01)
  *G06T 1/20*     (2006.01)
  *G06T 7/90*     (2017.01)

(52) U.S. Cl.
  CPC ............... *G06T 9/004* (2013.01); *G06T 1/20* (2013.01); *G06T 7/90* (2017.01); *G06T 9/001* (2013.01)

(58) Field of Classification Search
  CPC .. G06T 9/004; G06T 1/20; G06T 7/90; G06T 9/001; H04N 19/426; H04N 19/70; H04N 19/91; H04N 19/593
  See application file for complete search history.

(56) References Cited

U.S. PATENT DOCUMENTS 6,061,782 A * 5/2000 Elliott ................. G06F 9/30025
                                                        712/E9.021
9,185,424 B2 * 11/2015 Teng .................... H04N 19/172
(Continued)

FOREIGN PATENT DOCUMENTS

CN           103974056 A *  8/2014
EP           2993905 B1      5/2017
(Continued)

OTHER PUBLICATIONS

Kiran et al., , "Design and performance measurement of a high-performance computing cluster", pub., Jul. 2, 2012, IEEE (Year: 2012).*

(Continued)

*Primary Examiner* — Mekonen T Bekele
(74) *Attorney, Agent, or Firm* — QUALCOMM Incorporated

(57) ABSTRACT

The present disclosure relates to methods and devices for data or graphics processing including an apparatus, e.g., a GPU. The apparatus may receive at least one bitstream including a plurality of bits, each of the bits corresponding to a position in the at least one bitstream, and each of the bits being associated with color data. The apparatus may also arrange an order of the plurality of bits in the at least one bitstream, such that at least one of the bits corresponds to an updated position in the at least one bitstream. Additionally, the apparatus may convert, upon arranging the order of the bits, the color data associated with each of the plurality of bits in the at least one bitstream. The apparatus may also compress, upon converting the color data associated with each of the bits, the plurality of bits in the at least one bitstream.

36 Claims, 7 Drawing Sheets

(56) References Cited

U.S. PATENT DOCUMENTS

| | | |
|---|---|---|
| 10,250,899 B1 | 4/2019 | Hsieh et al. |
| 10,779,005 B2 | 9/2020 | Siver et al. |
| 2013/0129239 A1* | 5/2013 | Fukuhara ............. H04N 19/182 |
| | | 382/233 |
| 2017/0013266 A1 | 1/2017 | Ikizyan et al. |
| 2019/0313110 A1 | 10/2019 | Mammou et al. |

FOREIGN PATENT DOCUMENTS

| | | | |
|---|---|---|---|
| JP | H0566923 A | * | 3/1993 |
| WO | 2013006370 A1 | | 1/2013 |

OTHER PUBLICATIONS

International Search Report and Written Opinion—PCT/US2022/011329—ISA/EPO—Apr. 11, 2022.

* cited by examiner

METHODS AND APPARATUS FOR LOSSLESS COMPRESSION OF GPU DATA

TECHNICAL FIELD

The present disclosure relates generally to processing systems and, more particularly, to one or more techniques for data or graphics processing.

INTRODUCTION

Computing devices often perform graphics and/or display processing (e.g., utilising a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that can perform data or graphics processing. The apparatus may receive at least one bitstream including a plurality of bits, each of the plurality of bits corresponding to a position in the at least one bitstream, and each of the plurality of bits being associated with color data. The apparatus may also arrange an order of the plurality of bits in the at least one bitstream, such that at least one of the plurality of bits corresponds to an updated position in the at least one bitstream. Additionally, the apparatus may convert, upon arranging the order of the plurality of bits, the color data associated with each of the plurality of bits in the at least one bitstream. The apparatus may also compress, upon converting the color data associated with each of the plurality of bits, the plurality of bits in the at least one bitstream. The apparatus may also encode, upon compressing the plurality of bits, the plurality of bits in the at least one bitstream. The apparatus may also transmit, to a memory, the at least one bitstream including the compressed plurality of bits. The apparatus may also receive, from the memory, the at least one bitstream including the compressed plurality of bits; decode the compressed plurality of bits in the at least one bitstream; decompress the plurality of bits in the at least one bitstream; reconvert the color data associated with each of the plurality of bits in the at least one bitstream; rearrange an order of the plurality of bits in the at least one bitstream; and transmit the at least one bitstream including the plurality of bits.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
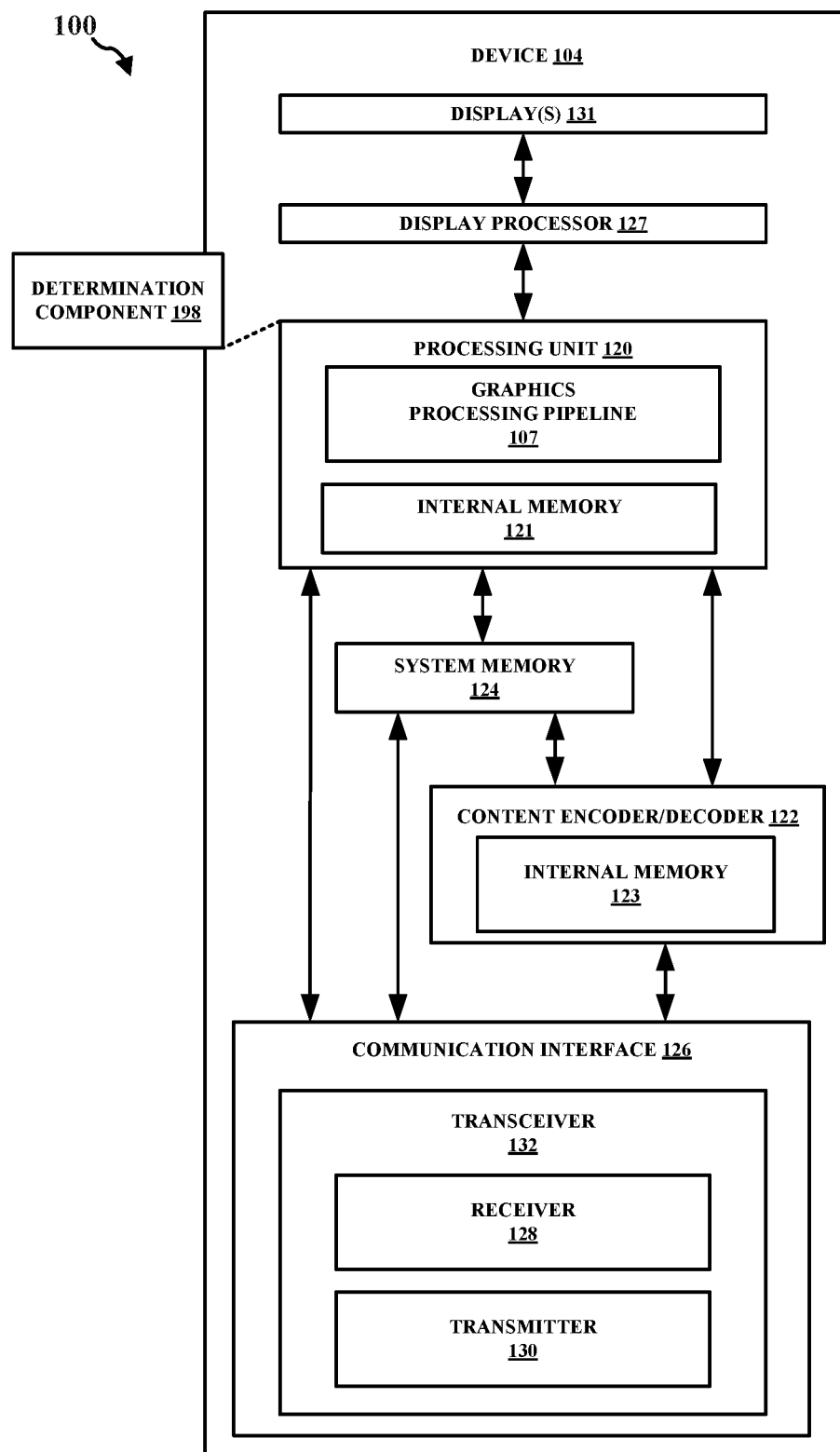
FIG. 1 is a block diagram that illustrates an example content generation system in accordance with one or more techniques of this disclosure.

There are a number of different types of compression techniques that can be utilized in data processing or graphics processing. For example, universal bandwidth compression (UBWC) or universal bandwidth decompression techniques may be utilized in data processing or graphics processing. An R11G11B10 data format may be utilized in data processing or graphics processing, where the R11G11B10 data format corresponds to compressed floating point data, i.e., compressed floating point red (R) green (G) blue (B) (RGB) data. In some aspects, floating point textures or vertex data may correspond to a high bandwidth consumption. For instance, floating point textures or vertex data may result in a certain amount of bits per-pixel (bpp), e.g., 96 bpp, for RGB data. As an R11G11B10 data format utilizes 32 bpp, this may correspond to a high amount of bandwidth usage. In some instances, due to an uneven bit-depth of a B channel in RGB data, these formats may not be easy to compress in lossless manner. For instance, it may be difficult to de-correlate data for the R channel, G channel, and B channel. Aspects of the present disclosure may compress certain types of data formats, e.g., an R11G11B10 data format, in a lossless manner. Aspects of the present disclosure may also compress certain types of data formats, e.g., an R11G11B10 data format, in a lossless manner for graphics processing or GPU applications. Moreover, aspects of the present disclosure may allow for the de-correlation of data for different color channels, e.g., the R channel, G channel, and/or B channel, for certain types of data formats, e.g., an R11G11B10 data format. Aspects of the present disclosure may also reduce the amount of bandwidth consumed for lossless compression data formats. For example, aspects of the present disclosure may reduce the amount of bandwidth utilized by a R11G11B10 data format at a GPU.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to receive at least one bitstream including a plurality of bits, each of the plurality of bits corresponding to a position in the at least one bitstream, and each of the plurality of bits being associated with color data. The determination component 198 may also be configured to arrange an order of the plurality of bits in the at least one bitstream, such that at least one of the plurality of bits corresponds to an updated position in the at least one bitstream. The determination component 198 may also be configured to convert, upon arranging the order of the plurality of bits, the color data associated with each of the plurality of bits in the at least one bitstream. The determination component 198 may also be configured to compress, upon converting the color data associated with each of the plurality of bits, the plurality of bits in the at least one bitstream. The determination component 198 may also be configured to encode, upon compressing the plurality of bits, the plurality of bits in the at least one bitstream. The determination component 198 may also be configured to transmit, to a memory, the at least one bitstream including the compressed plurality of bits. The determination component 198 may also be configured to receive, from the memory, the at least one bitstream including the compressed plurality of bits; decode the compressed plurality of bits in the at least one bitstream; decompress the plurality of bits in the at least one bitstream; reconvert the color data associated with each of the plurality of bits in the at least one bitstream; rearrange an order of the plurality of bits in the at least one bitstream; and transmit the at least one bitstream including the plurality of bits. Although the following description may be focused on data or graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
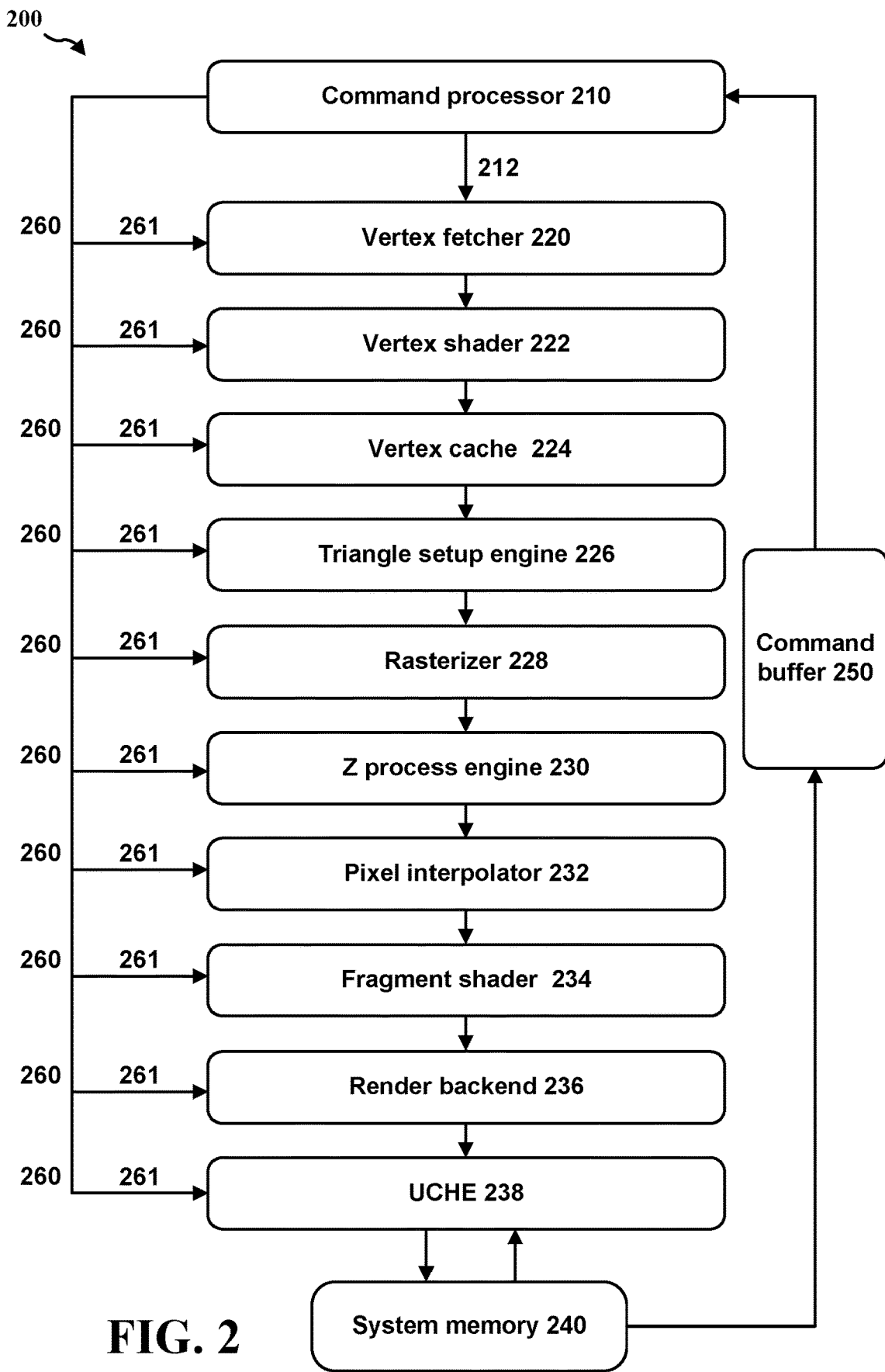
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Some aspects of data or graphics processing may utilize lossless compression, which is a type of data compression that corresponds to an accurate reconstruction of compressed data, i.e., data that is reconstructed without any data loss. In some instances, lossless compression may be associated with improved data compression rates, as the data may be largely reconstructed correctly. This high level of data reconstruction may correspond to reduced data sizes or reduced media sizes for the data. Lossless compression techniques may also include a number of different data compression algorithms that may allow the data to be reconstructed without any data loss.

There are a number of different types of compression techniques that can be utilized in data processing or graphics processing. For example, universal bandwidth compression (UBWC) or universal bandwidth decompression techniques may be utilized in data processing or graphics processing. Further, different data formats may be associated with UBWC compression techniques that are utilized in data processing or graphics processing. For instance, an R11G11B10 data format may be utilized in data processing or graphics processing, where the R11G11B10 data format corresponds to compressed floating point data, i.e., compressed floating point red (R) green (G) blue (B) (RGB) data. The R11G11B10 data format may include 11 bits in the R channel, 11 bits in the G channel, and 10 bits in the B channel. In some aspects, R11G11B10 data may be utilized as a format for texture files and/or rendering, e.g., texture files and/or rendering during graphics processing at a GPU. R11G11B10 data may allow certain GPU components, e.g., double data rate (DDR) memory, to reduce the amount of data fetched or retrieved at the GPU. Additionally, R11G11B10 data may correspond to a reduced amount of memory bandwidth utilized.

In some aspects, floating point textures or vertex data may correspond to a high bandwidth consumption. For instance, floating point textures or vertex data may result in a certain amount of bits per-pixel (bpp), e.g., 96 bpp, for RGB data. This RGB data may differ from RGBA data in that the RGB data has no alpha value. Some techniques to save bandwidth may utilize a half float data format, e.g., a half float RGB161616 data format (corresponding to 48 bpp), or a R11G11B10 data format (corresponding to 32 bpp). As an R11G11B10 data format utilizes 32 bpp, this may correspond to a high amount of bandwidth usage. In some instances, due to an uneven bit-depth of a B channel in RGB data, these formats may not be easily compressed in a lossless manner. For instance, it may be difficult to de-correlate data for the R channel, G channel, and B channel.

Based on the above, it may be beneficial to compress certain types of data formats in a lossless manner, e.g., an R11G11B10 data format. It may also be beneficial to compress these data formats in a lossless manner for graphics processing or GPU applications. Further, it may be beneficial to allow for the de-correlation of data for different color channels, e.g., the R channel, G channel, and/or B channel, for these types of data formats. It may also be beneficial to reduce the amount of bandwidth consumed for lossless compression data formats.

Aspects of the present disclosure may compress certain types of data formats, e.g., an R11G11B10 data format, in a lossless manner. Aspects of the present disclosure may also compress certain types of data formats, e.g., an R11G11B10 data format, in a lossless manner for graphics processing or GPU applications. Moreover, aspects of the present disclosure may allow for the de-correlation of data for different color channels, e.g., the R channel, G channel, and/or B channel, for certain types of data formats, e.g., an R11G11B10 data format. Aspects of the present disclosure may also reduce the amount of bandwidth consumed for lossless compression data formats. For example, aspects of the present disclosure may reduce the amount of bandwidth utilized by a R11G11B10 data format at a GPU.

Some aspects of the present disclosure may utilize a lossless compression technique for certain types of data, e.g., R11G11B10 data or RGB111110 data, using a bit rearranging technique. For instance, aspects of the present disclosure may utilize a lossless compression process for data, e.g., R11G11B10 data, using bit rearranging from a particular bit format, e.g., a 11-11-10 bit format, to another bit format, e.g., a 10-10-10-2 bit format. This bit rearranging process may be followed by a decorrelation process, e.g., an RGB decorrelation, which may use certain types of conversion, e.g., a luma (Y) chrominance orange (Co) chrominance green (Cg) (YCoCg) conversion. Following the decorrelation process, aspects of the present disclosure may utilize a lossless compression technique that exploits a spatial correlation, e.g., a spatial correlation in a Y-Co-Cg color space.

Figure 3:
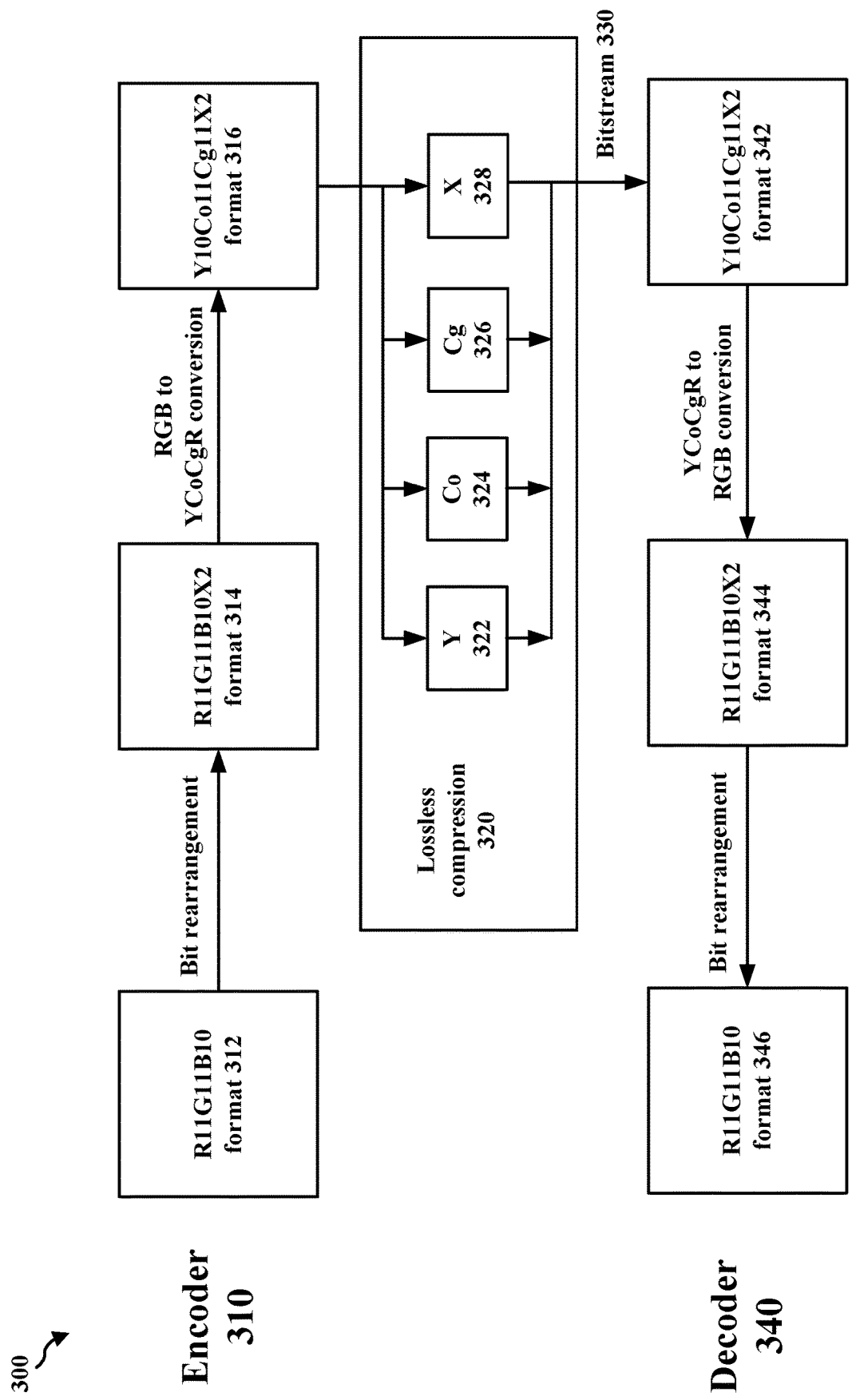
FIG. 3 is a diagram illustrating a data compression process for data or graphics processing in accordance with one or more techniques of this disclosure.

FIG. 3 is a diagram 300 illustrating a data compression process for data or graphics processing in accordance with one or more techniques of this disclosure. As shown in FIG. 3, diagram 300 includes an encoder 310, R11G11B10 data format 312, R11G11B10X2 data format 314, and Y10Co11Cg11X2 data format 316. Diagram 300 also includes lossless compression process 320 including Y channel 322, Co channel 324, Cg channel 326, and X channel 328. Diagram 300 also includes bitstream 330, decoder 340, Y10Co11Cg11X2 data format 342, R11G11B10X2 data format 344, and R11G11B10 data format 346. FIG. 3 illustrates a lossless compression process for R11G11B10 data. More specifically, FIG. 3 displays a lossless compression process for R11G11B10 data using bit rearrangement from a certain bit format, e.g., a 11-11-10 bit format, to another bit format, e.g., a 10-10-10-2 bit format. FIG. 3 also shows a decorrelation process, e.g., an RGB decorrelation, which may use a Y-Co-Cg conversion. As shown in FIG. 3, diagram 300 may also include a lossless compression technique that exploits a spatial correlation in a Y-Co-Cg format.

As shown in FIG. 3, the encoder 310, e.g., an engine at the encoder 310, may rearrange color data in order to make the color data more suitable for compression. For instance, the encoder 310 may rearrange the bits of RGB data format 312 into another color format, e.g., R11G11B10X2 data format 314 associated with an RGBA format. During the process, the encoder 310 may separate the bits in the R and G channels to make a separate planar channel, e.g., an X channel. After this, the encoder 310 may convert the data bits into a color space by performing an RGB to YCoCgR conversion. This color space conversion may result in a data format that is more suitable for compression, e.g., Y10Co11Cg11X2 data format 316, as this results in correlation across multiple channels.

After this color space conversion, aspects of the present disclosure may perform a lossless compression process 320, e.g., at a UBWC engine. This lossless compression process 320 may utilize different channels, e.g., Y channel 322, Co channel 324, Cg channel 326, and X channel 328. Also, after the lossless compression process 320, i.e., a 2D compression, the data can be formed into a bitstream, e.g., bitstream 330, for storage into memory, e.g., DDR memory. Accordingly, the data is encoded prior to storage in a DDR memory.

As shown in FIG. 3, after being stored in DDR memory, the bitstream 330 can be decoded at a decoder 340. In some aspects, the bitstream 330 may include a header, metadata, and/or compressed data. The header can include information for the decoder 340, such as information regarding which color space conversion or compression format to utilise. At the decoder 340, the bitstream 330 may be in a Y10Co11Cg11X2 data format, e.g., Y10Co11Cg11X2 data format 342. Decoder 340 may then perform a YCoCgR to RGB conversion, which may result in R11G11B10X2 data format 344. After this, decoder 340 may perform a bit rearrangement that results in R11G11B10 data format 346. Accordingly, decoder 340 may perform the inverse function of each of the steps performed by the encoder 310. By doing so, the decoder 340 may obtain the original data received and processed by the encoder 310. In some aspects, the encoder 310 and decoder 340 may be in a GPU between the GPU pipeline and the DDR memory. Also, the encoder 310 and decoder 340 may be at a chipset in a GPU, as well as associated with a display.

As indicated above, in order to apply a color space conversion or correction to a certain data format, e.g., an R11G11B10 format, aspects of the present disclosure may apply a bit rearrangement process. For example, aspects of the present disclosure may rearrange certain bits of data in order to allow color channels, e.g., R, G, and B channels, to have a same bit depth. By doing so, this may result in data that is more suitable for a color-space conversion. In some aspects, the present disclosure may rearrange the R and G bits of RGB data formats to align with the format of the B bits. For instance, in an R11G11B10 format, both the R and G channels include 11 bits, but the B channel includes 10 bits. As such, aspects of the present disclosure may rearrange the 11-bit format of the R and G channels in RGB data formats to conform with the 10-bit format of the B channel.

As there are many possible color mappings for color-space conversion, aspects of the present disclosure may minimize the bit-depth of certain channels, e.g., an X channel bit-depth, and maximize a bit-depth of other channels, e.g., channels that are suitable for color-space conversion. In one aspect, this process may be achieved by moving a certain number of bits, e.g., m bits, from the R channel and the G channel to another channel, e.g., an X channel. This may result in the other channel, e.g., an X channel, having a certain bit depth, e.g., a bit depth of 2m bits. Also, the number of bits, e.g., m bits, may be selected based on results or experiments that maximize a lossless compression ratio.

In some aspects, after a bit rearrangement process, aspects of the present disclosure may apply a color space conversion. Certain color spaces, e.g., Y-Co-Cg-R color spaces, may be more suitable for certain types of data prediction, e.g., a two-dimensional (2D) prediction. After the generation of color channels, e.g., RGBX channels, certain types of data, e.g., RGB data, may go through a lossless color space conversion to a certain color space, e.g., a Y-Co-Cg color space. Also, the RGBX channels may correspond to a certain color data format, e.g., an RGBA format. For example, during this conversion, Y may occupy an amount of bits, e.g., n bits, and Co/Cg may occupy another amount of bits, e.g., n+1 bits, where n is an original bit depth of the R/G/B channels in the RGBX channels. As indicated above, certain channels may be excluded from the conversion process, e.g., the X channel. After this conversion process, Y-Co-Cg-X data may be sent to a prediction engine, e.g., a spatial 2D prediction engine. Additionally, all of the data in the aforementioned color space conversion may be interleaved, e.g., the RGB data, the RGBX data, and the YCoCgX data may be interleaved. Accordingly, the data in the color space conversion can correspond to a 2D planar conversion.

Figure 4:
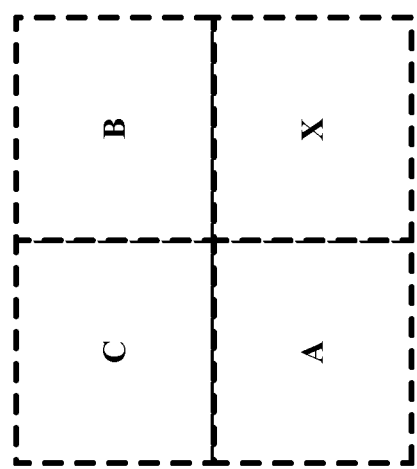
FIG. 4 is a diagram illustrating a data prediction process for data or graphics processing in accordance with one or more techniques of this disclosure.

FIG. 4 is a diagram 400 illustrating a data prediction process for data or graphics processing in accordance with one or more techniques of this disclosure. FIG. 4 shows a data prediction process that may be utilized at a prediction engine, e.g., a spatial 2D prediction engine. As shown in FIG. 4, all four channels, e.g., the channels for pixels A, B, C, and X, may go through a spatial compression process. For a 2D prediction, aspects of the present disclosure may utilize a spatial neighbor predictor or a parallelogram predictor, as shown in diagram 400.

Diagram 400 includes a pixel to be predicted, e.g., pixel X, as well as spatial neighbor pixels, e.g., pixel A, pixel B, and pixel C. As shown in FIG. 4, a predictor (e.g., X') for a pixel to be predicted, e.g., pixel X, may be generated using spatial neighbor pixels, e.g., pixels A, B, and C. The predictor (e.g., X') may be calculated by the following formula: X'=A+B−C. In some aspects, the predicted residuals may then be block fixed length coding (BFLC) coded (i.e., lossless coded) and placed in a bitstream with an appropriate header. Moreover, a decoding process may follow the inverse steps of each of the aforementioned steps to obtain the original data.

Figure 5:
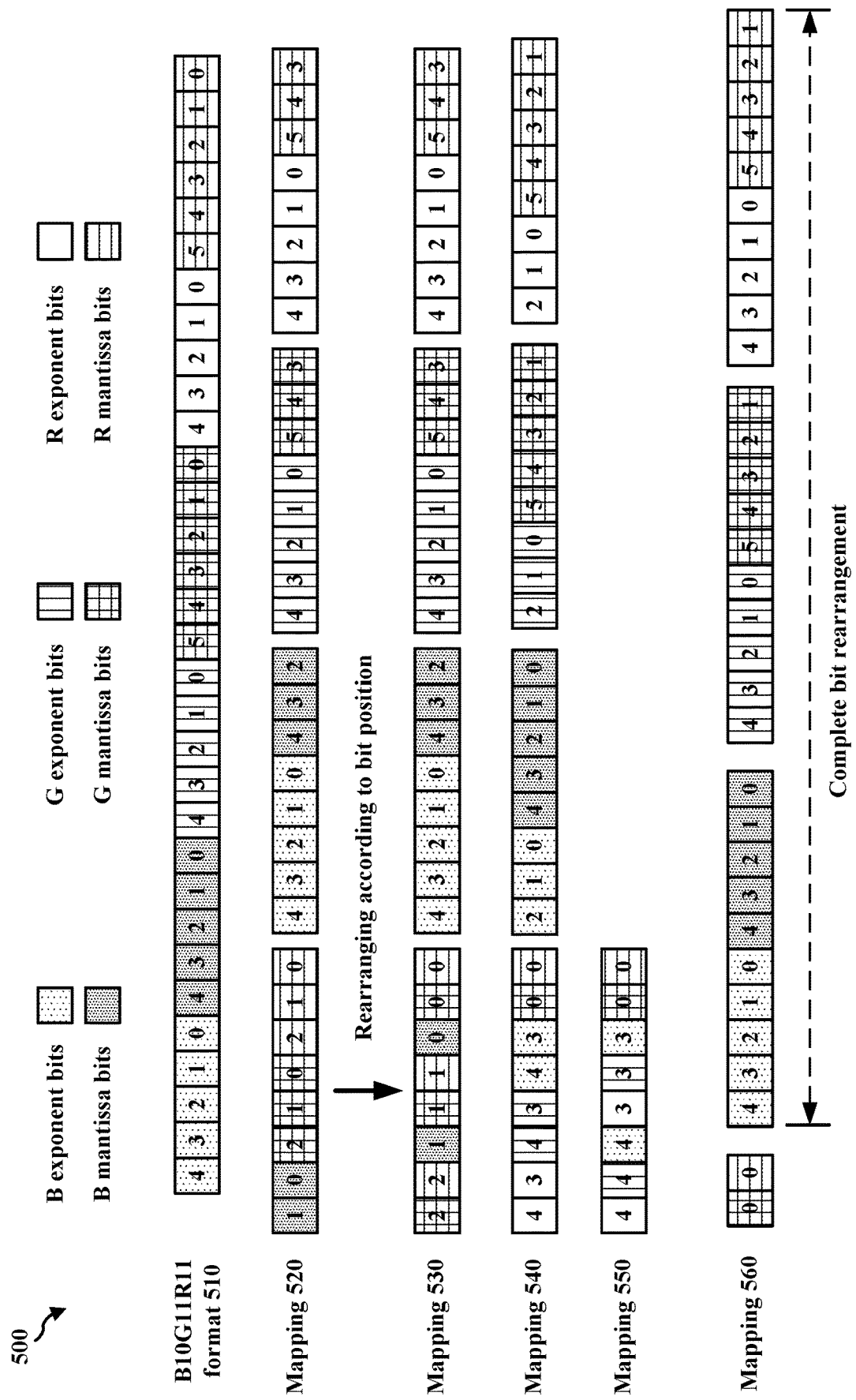
FIG. 5 is a diagram illustrating a bit rearrangement process for data or graphics processing in accordance with one or more techniques of this disclosure.

FIG. 5 is a diagram 500 illustrating a bit rearrangement process for data or graphics processing in accordance with one or more techniques of this disclosure. FIG. 5 displays a bit rearrangement process including a number of bits for a bit arrangement 510 and bit rearrangements or mappings 520, 530, 540, 550, and 560. That is, diagram 500 includes an initial bit arrangement, e.g., B10G11R11 format 510, and a number of different bit rearrangements (i.e., mappings), e.g., mappings 520, 530, 540, 550, and 560. Each of the bit rearrangements (i.e., mappings) may be suitable for certain types of color space conversion or correction, e.g., an RGB color space conversion or correction. As shown in FIG. 5, bit arrangement 510 may include a number of bits in an R11G11B10 format, which may include exponent bits and floating point bits (i.e., mantissa bits) for each channel, e.g., R, G, and B channels. For instance, in bit arrangement 510 including R11G11B10 format, the R and G channels include 11 bits (5 exponent bits and 6 mantissa bits), while the B channel includes 10 bits (5 exponent bits and 5 mantissa bits).

As shown in FIG. 5, compared to bit arrangement 510, each of the bit rearrangements or mappings 520, 530, 540, 550, and 560 include a different number of exponent and mantissa bits for the R, G, and B channels. For instance, bit mapping 520 includes a B channel with 8 bits (e.g., 5 exponent bits and 3 mantissa bits), a G channel with 8 bits (e.g., 5 exponent bits and 3 mantissa bits), and an R channel with 8 bits (e.g., 5 exponent bits and 3 mantissa bits). Bit mapping 520 also includes an X channel with a combination of 8 RGB bits (e.g., 2 B mantissa bits, 3 G mantissa bits, and 3 R mantissa bits). As shown in FIG. 5, each of the mappings 520, 530, 540, 550, and 560 may include a bit rearrangement according to bit position. In bit mapping 530, the B channel includes 8 bits (e.g., 5 exponent bits and 3 mantissa bits), the G channel includes 8 bits (e.g., 5 exponent bits and 3 mantissa bits), and the R channel includes 8 bits (e.g., 5 exponent bits and 3 mantissa bits). Bit mapping 530 also includes an X channel with 8 RGB bits (e.g., 2 B mantissa bits, 3 G mantissa bits, and 3 R mantissa bits).

Additionally, bit mapping 540 includes the B channel with 8 bits (e.g., 3 exponent bits and 5 mantissa bits), the G channel with 8 bits (e.g., 3 exponent bits and 5 mantissa bits), and the R channel with 8 bits (e.g., 3 exponent bits and 5 mantissa bits). Bit mapping 540 also includes an X channel with 8 RGB bits (e.g., 2 B exponent bits, 2 G exponent bits, 1 G mantissa bit, 2 R exponent bits, and 1 R mantissa bit). Bit mapping 550 includes an X channel with a combination of 8 RGB bits (e.g., 2 B exponent bits, 2 G exponent bits, 1 G mantissa bit, 2 R exponent bits, and 1 R mantissa bit). Finally, bit mapping 560 includes the B channel with 10 bits (e.g., 5 exponent bits and 5 mantissa bits), the G channel with 10 bits (e.g., 5 exponent bits and 5 mantissa bits), and the R channel with 10 bits (e.g., 5 exponent bits and 5 mantissa bits). Bit mapping 560 also includes an X channel with 2 RGB bits (1 G mantissa bit and 1R mantissa bit). In bit mapping 560, each of the RGB channels include a similar amount of bits, e.g., 8 bits, including a similar amount of exponents bits (i.e., magnitude) and mantissa bits (i.e., floating point). As shown in FIG. 5, mapping 560 corresponds to a complete bit rearrangement.

Aspects of the present disclosure may include a number of benefits and advantages. For instance, based on the aforementioned compression processes, e.g., the compression process shown in FIG. 3, and the aforementioned bit rearrangements, e.g., the bit rearrangements shown in FIG. 5, aspects of the present disclosure may include a number of advantages. For example, in one aspect, an average bandwidth savings over a dataset of various files, e.g., GPU related files, may be a certain amount of lossless gain, e.g., a 15.93% lossless gain. So aspects of the present disclosure may decrease the amount of time and/or storage for a memory storage process, e.g., a 15.93% decrease in the amount of time and/or storage. Additionally, a certain amount of lossless gain, e.g., a 21.64% lossless gain, may be observed when the present disclosure is utilized with a spatial prediction process, as shown in FIG. 4. This spatial prediction process may be used for certain GPU files which show a strong horizontal correlation. In order to achieve these benefits and/or lossless gain, aspects of the present disclosure may utilize a certain data format, e.g., R11G11B10 format, with a certain prediction and coding process, e.g., a 2D prediction and a BFLC coding process.

Figure 6:
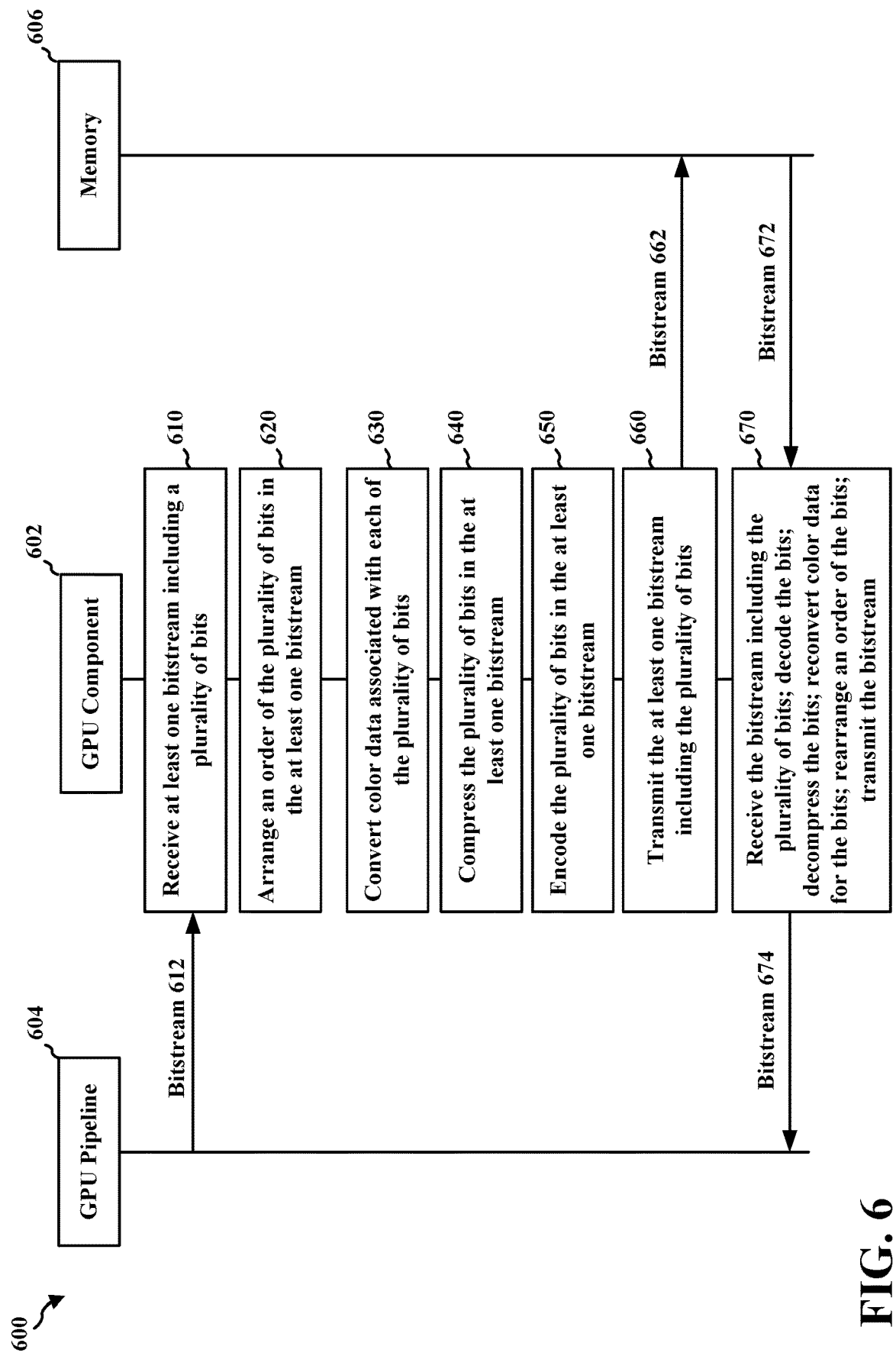
FIG. 6 is a communication flow diagram illustrating example communications between a GPU pipeline, a GPU component, and a memory in accordance with one or more techniques of this disclosure.

FIG. 6 is a communication flow diagram 600 of data or graphics processing in accordance with one or more techniques of this disclosure. As shown in FIG. 6, diagram 600 includes example communications between GPU component 602, e.g., a chipset at a GPU, GPU pipeline 604, and memory 606, e.g., DDR memory at a GPU, in accordance with one or more techniques of this disclosure.

At 610, GPU component 602 may receive at least one bitstream including a plurality of bits, e.g., bitstream 612 from GPU pipeline 604, each of the plurality of bits corresponding to a position in the at least one bitstream, and each of the plurality of bits being associated with color data. The plurality of bits may correspond to a 32-bit high dynamic range (HDR) format or a R11G11B10 format.

At 620, GPU component 602 may arrange an order of the plurality of bits in the at least one bitstream, e.g., bitstream 612/662, such that at least one of the plurality of bits corresponds to an updated position in the at least one bitstream. The order of the plurality of bits may be arranged by moving one or more floating point bits in the at least one bitstream. Also, the one or more floating point bits may be moved to a beginning of the order of the plurality of bits or an end of the order of the plurality of bits. The one or more floating point bits may correspond to a red (R) floating point bit, a green (G) floating point bit, and a blue (B) floating point bit.

At 630, GPU component 602 may convert, upon arranging the order of the plurality of bits, the color data associated with each of the plurality of bits in the at least one bitstream, e.g., bitstream 612/662. The color data may be converted from red (R) green (G) blue (B) (RGB) data to luma (Y) chrominance orange (Co) chrominance green (Cg) (YCoCg) data. Further, the color data associated with each of the plurality of bits may be converted based on at least one of a color-space conversion or a lossless conversion.

At 640, GPU component 602 may compress, upon converting the color data associated with each of the plurality of bits, the plurality of bits in the at least one bitstream, e.g., bitstream 612. The plurality of bits may be compressed based on a predictive compression scheme. The predictive compression scheme may be based on spatial neighboring color data of the color data associated with each of the plurality of bits. Also, the predictive compression scheme may be associated with at least one of a spatial neighbor predictor or a parallelogram predictor. In some aspects, the plurality of bits in the at least one bitstream, e.g., bitstream 612/662, may be compressed into one or more data packets. The one or more data packets may be double data rate (DDR) packets. Moreover, the compression of the plurality of bits may be a lossless compression.

At 650, GPU component 602 may encode, upon compressing the plurality of bits, the plurality of bits in the at least one bitstream, e.g., bitstream 612/662. The plurality of bits may be encoded based on a block fixed length coding (BFLC) process. The plurality of bits may also be encoded by adding at least one of a header or metadata to the plurality of bits.

At 660, GPU component 602 may transmit, to a memory, e.g., memory 606, the at least one bitstream including the compressed plurality of bits, e.g., bitstream 662. The memory may be a double data rate (DDR) memory in a graphics processing unit (GPU).

At 670, GPU component 602 may receive, from the memory, e.g., memory 606, the at least one bitstream including the compressed plurality of bits, e.g., bitstream 672; decode the compressed plurality of bits in the at least one bitstream, e.g., bitstream 672/674; decompress the plurality of bits in the at least one bitstream, e.g., bitstream 672/674; reconvert the color data associated with each of the plurality of bits in the at least one bitstream, e.g., bitstream 672/674; rearrange an order of the plurality of bits in the at least one bitstream, e.g., bitstream 672/674; and transmit the at least one bitstream including the plurality of bits, e.g., bitstream 674.

Figure 7:
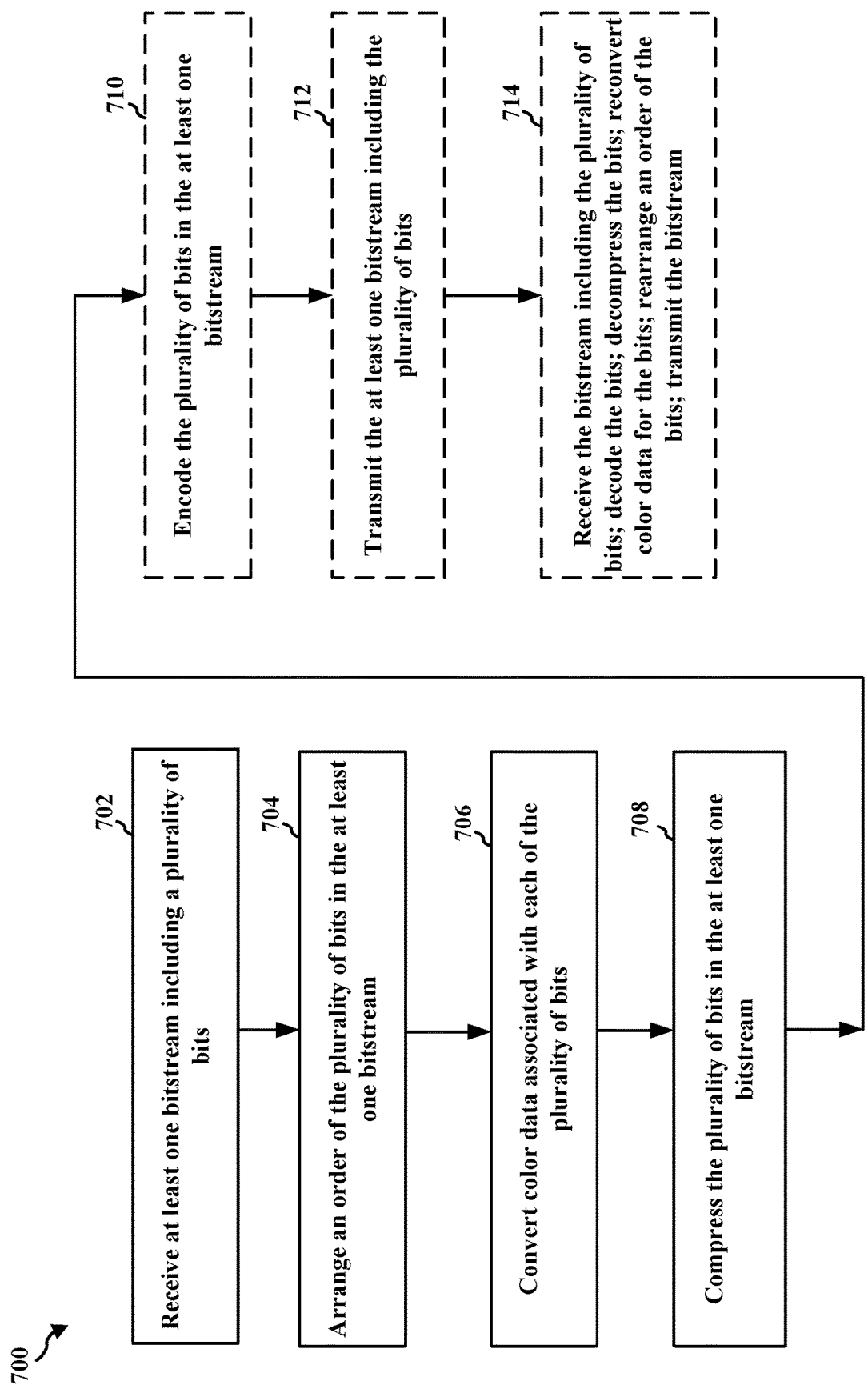
FIG. 7 is a flowchart of an example method of graphics processing in accordance with one or more techniques of this disclosure.

FIG. 7 is a flowchart 700 of an example method of data or graphics processing in accordance with one or more techniques of this disclosure. The method may be performed by an apparatus, such as an apparatus for graphics processing, a GPU or other graphics processor, a chipset, a GPU pipeline, a wireless communication device, and/or any apparatus that can perform data or graphics processing as used in connection with the examples of FIGS. 1-6.

At 702, the apparatus may receive at least one bitstream including a plurality of bits, each of the plurality of bits corresponding to a position in the at least one bitstream, and each of the plurality of bits being associated with color data, as described in connection with the examples in FIGS. 1-6. For example, GPU component 602 may receive at least one bitstream including a plurality of bits, each of the plurality of bits corresponding to a position in the at least one bitstream, and each of the plurality of bits being associated with color data. Further, processing unit 120 may perform 702. The plurality of bits may correspond to a 32-bit high dynamic range (HDR) format or a R11G11B10 format, as described in connection with the examples in FIGS. 1-6.

At 704, the apparatus may arrange an order of the plurality of bits in the at least one bitstream, such that at least one of the plurality of bits corresponds to an updated position in the at least one bitstream, as described in connection with the examples in FIGS. 1-6. For example, GPU component 602 may arrange an order of the plurality of bits in the at least one bitstream, such that at least one of the plurality of bits corresponds to an updated position in the at least one bitstream. Further, processing unit 120 may perform 704. The order of the plurality of bits may be arranged by moving one or more floating point bits in the at least one bitstream, as described in connection with the examples in FIGS. 1-6. Also, the one or more floating point bits may be moved to a beginning of the order of the plurality of bits or an end of the order of the plurality of bits, as described in connection with the examples in FIGS. 1-6. The one or more floating point bits may correspond to a red (R) floating point bit, a green (G) floating point bit, and a blue (B) floating point bit, as described in connection with the examples in FIGS. 1-6.

At 706, the apparatus may convert, upon arranging the order of the plurality of bits, the color data associated with each of the plurality of bits in the at least one bitstream, as described in connection with the examples in FIGS. 1-6. For example, GPU component 602 may convert, upon arranging the order of the plurality of bits, the color data associated with each of the plurality of bits in the at least one bitstream. Further, processing unit 120 may perform 706. The color data may be converted from red (R) green (G) blue (B) (RGB) data to luma (Y) chrominance orange (Co) chrominance green (Cg) (YCoCg) data, as described in connection with the examples in FIGS. 1-6. Further, the color data associated with each of the plurality of bits may be converted based on at least one of a color-space conversion or a lossless conversion, as described in connection with the examples in FIGS. 1-6.

At 708, the apparatus may compress, upon converting the color data associated with each of the plurality of bits, the plurality of bits in the at least one bitstream, as described in connection with the examples in FIGS. 1-6. For example, GPU component 602 may compress, upon converting the color data associated with each of the plurality of bits, the plurality of bits in the at least one bitstream. Further, processing unit 120 may perform 708. The plurality of bits may be compressed based on a predictive compression scheme, as described in connection with the examples in FIGS. 1-6. The predictive compression scheme may be based on spatial neighboring color data of the color data associated with each of the plurality of bits, as described in connection with the examples in FIGS. 1-6. Also, the predictive compression scheme may be associated with at least one of a spatial neighbor predictor or a parallelogram predictor, as described in connection with the examples in FIGS. 1-6. In some aspects, the plurality of bits in the at least one bitstream may be compressed into one or more data packets, as described in connection with the examples in FIGS. 1-6. The one or more data packets may be double data rate (DDR) packets. Moreover, the compression of the plurality of bits may be a lossless compression, as described in connection with the examples in FIGS. 1-6.

At 710, the apparatus may encode, upon compressing the plurality of bits, the plurality of bits in the at least one bitstream, as described in connection with the examples in FIGS. 1-6. For example, GPU component 602 may encode, upon compressing the plurality of bits, the plurality of bits in the at least one bitstream. Further, processing unit 120 may perform 710. The plurality of bits may be encoded based on a block fixed length coding (BFLC) process, as described in connection with the examples in FIGS. 1-6. The plurality of bits may also be encoded by adding at least one of a header or metadata to the plurality of bits, as described in connection with the examples in FIGS. 1-6.

At 712, the apparatus may transmit, to a memory, the at least one bitstream including the compressed plurality of bits, as described in connection with the examples in FIGS. 1-6. For example, GPU component 602 may transmit, to a memory, the at least one bitstream including the compressed plurality of bits. Further, processing unit 120 may perform 712. The memory may be a double data rate (DDR) memory in a graphics processing unit (GPU), as described in connection with the examples in FIGS. 1-6.

At 714, the apparatus may receive, from the memory, the at least one bitstream including the compressed plurality of bits; decode the compressed plurality of bits in the at least one bitstream; decompress the plurality of bits in the at least one bitstream; reconvert the color data associated with each of the plurality of bits in the at least one bitstream; rearrange an order of the plurality of bits in the at least one bitstream; and transmit the at least one bitstream including the plurality of bits, as described in connection with the examples in FIGS. 1-6. For example, GPU component 602 may receive, from the memory, the at least one bitstream including the compressed plurality of bits; decode the compressed plurality of bits in the at least one bitstream; decompress the plurality of bits in the at least one bitstream; reconvert the color data associated with each of the plurality of bits in the at least one bitstream; rearrange an order of the plurality of bits in the at least one bitstream; and transmit the at least one bitstream including the plurality of bits. Further, processing unit 120 may perform 714.

In configurations, a method or an apparatus for data or graphics processing is provided. The apparatus may be a GPU, a graphics processor, a data processor, or some other processor that may perform data or graphics processing. In aspects, the apparatus may be the processing unit 120 within the device 104, or may be some other hardware within the device 104 or another device. The apparatus may include means for receiving at least one bitstream including a plurality of bits, each of the plurality of bits corresponding to a position in the at least one bitstream, and each of the plurality of bits being associated with color data. The apparatus may further include means for arranging an order of the plurality of bits in the at least one bitstream, such that at least one of the plurality of bits corresponds to an updated position in the at least one bitstream. The apparatus may further include means for converting, upon arranging the order of the plurality of bits, the color data associated with each of the plurality of bits in the at least one bitstream. The apparatus may further include means for compressing, upon converting the color data associated with each of the plurality of bits, the plurality of bits in the at least one bitstream. The apparatus may further include means for encoding, upon compressing the plurality of bits, the plurality of bits in the at least one bitstream. The apparatus may further include means for transmitting, to a memory, the at least one bitstream including the compressed plurality of bits. The apparatus may further include means for receiving, from the memory, the at least one bitstream including the compressed plurality of bits. The apparatus may further include means for decoding the compressed plurality of bits in the at least one bitstream. The apparatus may further include means for decompressing the plurality of bits in the at least one bitstream. The apparatus may further include means for reconverting the color data associated with each of the plurality of bits in the at least one bitstream. The apparatus may further include means for rearranging an order of the plurality of bits in the at least one bitstream. The apparatus may further include means for transmitting the at least one bitstream including the plurality of bits.

The subject matter described herein can be implemented to realize one or more benefits or advantages. For instance, the described data or graphics processing techniques can be used by a GPU, a graphics processor, a data processor, or some other processor that can perform data or graphics processing to implement the lossless compression or color space conversion techniques described herein. This can also be accomplished at a low cost compared to other data or graphics processing techniques. Moreover, the data or graphics processing techniques herein can improve or speedup data processing or execution. Further, the data or graphics processing techniques herein can improve resource or data utilisation and/or resource efficiency. Additionally, aspects of the present disclosure can utilize lossless compression or color space conversion in order to improve memory bandwidth and/or reduce performance overhead at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of data or graphics processing. The method includes receiving at least one bitstream including a plurality of bits, each of the plurality of bits corresponding to a position in the at least one bitstream, and each of the plurality of bits being associated with color data; arranging an order of the plurality of bits in the at least one bitstream, such that at least one of the plurality of bits corresponds to an updated position in the at least one bitstream; converting, upon arranging the order of the plurality of bits, the color data associated with each of the plurality of bits in the at least one bitstream; and compressing, upon converting the color data associated with each of the plurality of bits, the plurality of bits in the at least one bitstream.

Aspect 2 is the method of aspect 1, where the order of the plurality of bits is arranged by moving one or more floating point bits in the at least one bitstream.

Aspect 3 is the method of any of aspects 1 and 2, where the one or more floating point bits are moved to a beginning of the order of the plurality of bits or an end of the order of the plurality of bits.

Aspect 4 is the method of any of aspects 1 to 3, where the one or more floating point bits correspond to a red (R) floating point bit, a green (G) floating point bit, and a blue (B) floating point bit.

Aspect 5 is the method of any of aspects 1 to 4, where the plurality of bits is compressed based on a predictive compression scheme.

Aspect 6 is the method of any of aspects 1 to 5, where the predictive compression scheme is based on spatial neighboring color data of the color data associated with each of the plurality of bits.

Aspect 7 is the method of any of aspects 1 to 6, where the predictive compression scheme is associated with at least one of a spatial neighbor predictor or a parallelogram predictor.

Aspect 8 is the method of any of aspects 1 to 7, where the color data is converted from red (R) green (G) blue (B) (RGB) data to luma (Y) chrominance orange (Co) chrominance green (Cg) (YCoCg) data.

Aspect 9 is the method of any of aspects 1 to 8, where the color data associated with each of the plurality of bits is converted based on at least one of a color-space conversion or a lossless conversion.

Aspect 10 is the method of any of aspects 1 to 9, where the plurality of bits corresponds to a 32-bit high dynamic range (HDR) format or a R11G11B10 format.

Aspect 11 is the method of any of aspects 1 to 10, further including encoding, upon compressing the plurality of bits, the plurality of bits in the at least one bitstream.

Aspect 12 is the method of any of aspects 1 to 11, where the plurality of bits is encoded based on a block fixed length coding (BFLC) process.

Aspect 13 is the method of any of aspects 1 to 12, where the plurality of bits is encoded by adding at least one of a header or metadata to the plurality of bits.

Aspect 14 is the method of any of aspects 1 to 13, further including transmitting, to a memory, the at least one bitstream including the compressed plurality of bits.

Aspect 15 is the method of any of aspects 1 to 14, further including receiving, from the memory, the at least one bitstream including the compressed plurality of bits; decoding the compressed plurality of bits in the at least one bitstream; decompressing the plurality of bits in the at least one bitstream; reconverting the color data associated with each of the plurality of bits in the at least one bitstream; rearranging an order of the plurality of bits in the at least one bitstream; and transmitting the at least one bitstream including the plurality of bits.

Aspect 16 is the method of any of aspects 1 to 15, where the memory is a double data rate (DDR) memory in a graphics processing unit (GPU).

Aspect 17 is the method of any of aspects 1 to 16, where the plurality of bits in the at least one bitstream is compressed into one or more data packets.

Aspect 18 is the method of any of aspects 1 to 17, where the one or more data packets are double data rate (DDR) packets.

Aspect 19 is the method of any of aspects 1 to 18, where the compression of the plurality of bits is a lossless compression.

Aspect 20 is an apparatus for data or graphics processing including at least one processor coupled to a memory and configured to implement a method as in any of aspects 1 to 19.

Aspect 21 is an apparatus for data or graphics processing including means for implementing a method as in any of aspects 1 to 19.

Aspect 22 is a computer-readable medium storing computer executable code, the code when executed by at least one processor causes the at least one processor to implement a method as in any of aspects 1 to 19.

What is claimed is:

1. A method of data processing, comprising:
receiving at least one bitstream including a plurality of bits, each of the plurality of bits corresponding to a position in the at least one bitstream, and each of the plurality of bits being associated with color data, wherein the plurality of bits includes a set of floating point bits and a set of exponent bits;
arranging an order of the plurality of bits in the at least one bitstream by moving one or more floating point bits of the set of floating point bits and one or more exponent bits of the set of exponent bits in the at least one bitstream, such that at least two of the plurality of bits corresponds to an updated position in the at least one bitstream, wherein the one or more floating point bits are moved to a beginning of the order of the plurality of bits or an end of the order of the plurality of bits;
converting, upon arranging the order of the plurality of bits, the color data associated with each of the plurality of bits in the at least one bitstream; and
compressing, upon converting the color data associated with each of the plurality of bits, the plurality of bits in the at least one bitstream.

2. The method of claim 1, wherein the one or more floating point bits correspond to a red (R) floating point bit, a green (G) floating point bit, and a blue (B) floating point bit.

3. The method of claim 1, wherein the plurality of bits is compressed based on a predictive compression scheme.

4. The method of claim 3, wherein the predictive compression scheme is based on spatial neighboring color data of the color data associated with each of the plurality of bits.

5. The method of claim 3, wherein the predictive compression scheme is associated with at least one of a spatial neighbor predictor or a parallelogram predictor.

6. The method of claim 1, wherein the color data is converted from red (R) green (G) blue (B) (RGB) data to luma (Y) chrominance orange (Co) chrominance green (Cg) (YCoCg) data.

7. The method of claim 1, wherein the color data associated with each of the plurality of bits is converted based on at least one of a color-space conversion or a lossless conversion.

8. The method of claim 1, wherein the plurality of bits corresponds to a 32-bit high dynamic range (HDR) format or a R11G11B10 format.

9. The method of claim 1, further comprising:
encoding, upon compressing the plurality of bits, the plurality of bits in the at least one bitstream.

10. The method of claim 9, wherein the plurality of bits is encoded based on a block fixed length coding (BFLC) process.

11. The method of claim 9, wherein the plurality of bits is encoded by adding at least one of a header or metadata to the plurality of bits.

12. The method of claim 1, further comprising:
transmitting, to a memory, the at least one bitstream including the compressed plurality of bits.

13. The method of claim 12, further comprising:
receiving, from the memory, the at least one bitstream including the compressed plurality of bits;
decoding the compressed plurality of bits in the at least one bitstream;
decompressing the plurality of bits in the at least one bitstream;
reconverting the color data associated with each of the plurality of bits in the at least one bitstream;
rearranging the order of the plurality of bits in the at least one bitstream; and
transmitting the at least one bitstream including the plurality of bits.

14. The method of claim 12, wherein the memory is a double data rate (DDR) memory in a graphics processing unit (GPU).

15. The method of claim 1, wherein the plurality of bits in the at least one bitstream is compressed into one or more data packets.

16. The method of claim 15, wherein the one or more data packets are double data rate (DDR) packets.

17. The method of claim 1, wherein the compression of the plurality of bits is a lossless compression.

18. An apparatus for data processing, comprising:
memory; and
at least one processor coupled to the memory and configured to:
receive at least one bitstream including a plurality of bits, each of the plurality of bits corresponding to a position in the at least one bitstream, and each of the plurality of bits being associated with color data, wherein the plurality of bits includes a set of floating point bits and a set of exponent bits;
arrange an order of the plurality of bits in the at least one bitstream by moving one or more floating point bits of the set of floating point bits and one or more exponent bits of the set of exponent bits in the at least one bitstream, such that at least two of the plurality of bits corresponds to an updated position in the at least one bitstream, wherein the one or more floating point bits are moved to a beginning of the order of the plurality of bits or an end of the order of the plurality of bits;
convert, upon arranging the order of the plurality of bits, the color data associated with each of the plurality of bits in the at least one bitstream; and
compress, upon converting the color data associated with each of the plurality of bits, the plurality of bits in the at least one bitstream.

19. The apparatus of claim 18, wherein the one or more floating point bits correspond to a red (R) floating point bit, a green (G) floating point bit, and a blue (B) floating point bit.

20. The apparatus of claim 18, wherein to compress the plurality of bits, the at least one processor is configured to compress the plurality of bits based on a predictive compression scheme.

21. The apparatus of claim 20, wherein the predictive compression scheme is based on spatial neighboring color data of the color data associated with each of the plurality of bits.

22. The apparatus of claim 20, wherein the predictive compression scheme is associated with at least one of a spatial neighbor predictor or a parallelogram predictor.

23. The apparatus of claim 18, wherein to convert the color data, the at least one processor is configured to convert the color data from red (R) green (G) blue (B) (RGB) data to luma (Y) chrominance orange (Co) chrominance green (Cg) (YCoCg) data.

24. The apparatus of claim 18, wherein to convert the color data, the at least one processor is configured to convert the color data associated with each of the plurality of bits based on at least one of a color-space conversion or a lossless conversion.

25. The apparatus of claim 18, wherein the plurality of bits corresponds to a 32-bit high dynamic range (HDR) format or a R11G11B10 format.

26. The apparatus of claim 18, wherein the at least one processor is further configured to:
encode, upon compressing the plurality of bits, the plurality of bits in the at least one bitstream.

27. The apparatus of claim 26, wherein to encode the plurality of bits, the at least one processor is configured to encode the plurality of bits based on a block fixed length coding (BFLC) process.

28. The apparatus of claim 26, wherein to encode the plurality of bits, the at least one processor is configured to encode the plurality of bits by adding at least one of a header or metadata to the plurality of bits.

29. The apparatus of claim 18, wherein the at least one processor is further configured to:
transmit, to a first memory, the at least one bitstream including the compressed plurality of bits.

30. The apparatus of claim 29, wherein the at least one processor is further configured to:
receive, from the memory, the at least one bitstream including the compressed plurality of bits;
decode the compressed plurality of bits in the at least one bitstream;
decompress the plurality of bits in the at least one bitstream;
reconvert the color data associated with each of the plurality of bits in the at least one bitstream;
rearrange the order of the plurality of bits in the at least one bitstream; and
transmit the at least one bitstream including the plurality of bits.

31. The apparatus of claim 29, wherein the memory is a double data rate (DDR) memory in a graphics processing unit (GPU).

32. The apparatus of claim 18, wherein to compress the plurality of bits, the at least one processor is configured to compress the plurality of bits in the at least one bitstream into one or more data packets.

33. The apparatus of claim 32, wherein the one or more data packets are double data rate (DDR) packets.

34. The apparatus of claim 18, wherein the compression of the plurality of bits is a lossless compression.

35. An apparatus for data processing, comprising:
means for receiving at least one bitstream including a plurality of bits, each of the plurality of bits corresponding to a position in the at least one bitstream, and each of the plurality of bits being associated with color data, wherein the plurality of bits includes a set of floating point bits and a set of exponent bits;
means for arranging an order of the plurality of bits in the at least one bitstream by moving one or more floating point bits of the set of floating point bits and one or more exponent bits of the set of exponent bits in the at least one bitstream, such that at least two of the plurality of bits corresponds to an updated position in the at least one bitstream, wherein the one or more floating point bits are moved to a beginning of the order of the plurality of bits or an end of the order of the plurality of bits;
means for converting, upon arranging the order of the plurality of bits, the color data associated with each of the plurality of bits in the at least one bitstream; and
means for compressing, upon converting the color data associated with each of the plurality of bits, the plurality of bits in the at least one bitstream.

36. A computer-readable medium storing computer executable code for data processing, the code when executed by a processor causes the processor to:
receive at least one bitstream including a plurality of bits, each of the plurality of bits corresponding to a position in the at least one bitstream, and each of the plurality of bits being associated with color data, wherein the plurality of bits includes a set of floating point bits and a set of exponent bits;
arrange an order of the plurality of bits in the at least one bitstream by moving one or more floating point bits of the set of floating point bits and one or more exponent bits of the set of exponent bits in the at least one bitstream, such that at least two of the plurality of bits corresponds to an updated position in the at least one bitstream, wherein the one or more floating point bits are moved to a beginning of the order of the plurality of bits or an end of the order of the plurality of bits;
convert, upon arranging the order of the plurality of bits, the color data associated with each of the plurality of bits in the at least one bitstream; and
compress, upon converting the color data associated with each of the plurality of bits, the plurality of bits in the at least one bitstream.

* * * * *